United States Patent
Mayell et al.

(10) Patent No.: US 9,866,108 B2
(45) Date of Patent: Jan. 9, 2018

(54) PFC SHUTDOWN CIRCUIT FOR LIGHT LOAD

(71) Applicant: Power Integrations, Inc., San Jose, CA (US)

(72) Inventors: Robert J. Mayell, Los Altos, CA (US); Bala Sudhakar Singamaneni, Fremont, CA (US)

(73) Assignee: Power Intergrations, Inc., San Jose, CA (US)

( * ) Notice: Subject to any disclaimer, the term of this patent is extended or adjusted under 35 U.S.C. 154(b) by 207 days.

(21) Appl. No.: 14/876,734

(22) Filed: Oct. 6, 2015

(65) Prior Publication Data

US 2016/0105095 A1   Apr. 14, 2016

Related U.S. Application Data

(60) Provisional application No. 62/061,628, filed on Oct. 8, 2014.

(51) Int. Cl.
*H02M 1/42* (2007.01)
*H02M 1/00* (2006.01)

(52) U.S. Cl.
CPC .......... *H02M 1/42* (2013.01); *H02M 1/4225* (2013.01); *H02M 2001/007* (2013.01); *H02M 2001/0032* (2013.01); *Y02B 70/126* (2013.01); *Y02B 70/16* (2013.01)

(58) Field of Classification Search
CPC ......... H02M 1/4225; H02M 2001/007; H02M 2001/0032; H02M 2001/0035; H02M 2001/0006
See application file for complete search history.

(56) References Cited

U.S. PATENT DOCUMENTS

| | | | | | |
|---|---|---|---|---|---|
| 5,440,475 | A | * | 8/1995 | Russell | ..................... G05F 1/70 315/209 R |
| 5,844,792 | A | * | 12/1998 | Moreau | ............... H02M 1/4208 320/166 |
| 8,957,600 | B1 | * | 2/2015 | Levy | ......................... 315/200 R |
| 9,197,132 | B2 | * | 11/2015 | Artusi | ................. H02M 1/4225 |
| 2003/0099119 | A1 | * | 5/2003 | Yamada | .............. H02M 1/4225 363/21.12 |
| 2005/0088862 | A1 | * | 4/2005 | Simada | .................... H02M 1/36 363/49 |
| 2005/0269997 | A1 | * | 12/2005 | Usui | .................... H02M 1/4225 323/207 |
| 2008/0018261 | A1 | * | 1/2008 | Kastner | ................... F21V 23/00 315/192 |
| 2009/0310386 | A1 | * | 12/2009 | Takeuchi | ............ H02M 1/4225 363/21.1 |
| 2010/0156509 | A1 | * | 6/2010 | Ryu | .................... H02M 1/4208 327/520 |
| 2010/0208500 | A1 | * | 8/2010 | Yan | ................... H02M 3/33523 363/21.12 |

(Continued)

*Primary Examiner* — Yusef Ahmed
(74) *Attorney, Agent, or Firm* — Christensen O'Connor Johnson Kindness PLLC

(57) ABSTRACT

A power converter includes a front end stage having a power factor correction controller, an output stage with a DC/DC controller, and light load detection circuitry coupled to detect relatively low power consumption by a load on an output of the output stage. In response to the detection, the power factor correction controller in the front end stage is turned off.

38 Claims, 9 Drawing Sheets

(56) References Cited

U.S. PATENT DOCUMENTS

| | | | |
|---|---|---|---|
| 2010/0226149 A1* | 9/2010 | Masumoto | H02M 1/4225 363/20 |
| 2011/0080102 A1* | 4/2011 | Ge | H05B 33/0815 315/200 R |
| 2011/0110000 A1* | 5/2011 | Etter | H02M 1/32 361/18 |
| 2011/0141776 A1* | 6/2011 | Lin | H02H 7/125 363/53 |
| 2011/0235374 A1* | 9/2011 | Myers | H02M 1/32 363/50 |
| 2012/0091970 A1* | 4/2012 | Cho | H02J 7/022 320/160 |
| 2012/0250366 A1* | 10/2012 | Wang | H02M 3/33523 363/21.15 |
| 2013/0016531 A1* | 1/2013 | Aso | H02M 1/4225 363/16 |
| 2013/0020872 A1* | 1/2013 | Kinnard | H02J 9/061 307/64 |
| 2013/0033905 A1* | 2/2013 | Lin | H02M 3/33507 363/21.13 |
| 2013/0329463 A1* | 12/2013 | Chen | H02M 1/4258 363/17 |
| 2014/0043866 A1* | 2/2014 | Zhao | H02M 3/33507 363/21.12 |
| 2014/0043876 A1* | 2/2014 | Tsou | H02M 7/04 363/78 |
| 2014/0084835 A1* | 3/2014 | Kadowaki | H02M 1/32 318/479 |
| 2014/0177301 A1* | 6/2014 | Kim | H02M 7/23 363/84 |
| 2014/0185334 A1* | 7/2014 | Chen | H02M 1/4225 363/21.12 |
| 2014/0218976 A1* | 8/2014 | Luo | H02M 1/08 363/21.01 |
| 2015/0092458 A1* | 4/2015 | Levy | H02M 3/33507 363/21.12 |
| 2015/0092463 A1* | 4/2015 | Lee | H02M 1/4225 363/89 |
| 2015/0103569 A1* | 4/2015 | Zhang | H02M 3/33507 363/21.16 |
| 2015/0198634 A1* | 7/2015 | Brinlee | G01R 31/28 324/72.5 |
| 2016/0128144 A1* | 5/2016 | Tikkanen | H05B 33/0815 315/301 |
| 2016/0141964 A1* | 5/2016 | Yu | H02M 3/33507 363/21.02 |
| 2016/0322907 A1* | 11/2016 | Hwang | H02M 1/36 |
| 2017/0261910 A1* | 9/2017 | Kasamatsu | G03G 15/80 |

* cited by examiner

PFC SHUTDOWN CIRCUIT FOR LIGHT LOAD

CROSS-REFERENCE TO RELATED APPLICATIONS

This application claims the benefit of U.S. Provisional Application No. 62/061,628 filed on Oct. 8, 2014, the contents of which are incorporated herein by reference.

BACKGROUND INFORMATION

Field of the Disclosure

The present disclosure relates generally to power converters, and more specifically, to ac-dc and/or dc-dc switched mode power converters that use a power factor correction (PFC) stage.

Background

Many electrical devices, such as cell phones, personal digital assistants (PDA's), laptops, etc., use power to operate. Because power is generally delivered through a wall socket as high voltage alternating current (ac), power converters are typically used to convert alternating current ("ac") power provided by an electrical outlet into direct current ("dc") to supply an electrical device or load.

Many power converters employ a power factor correction (PFC) stage in order to correct the non-sinusoidal wave shape of the current drawn from the ac source by the power converter. If the input ac current and voltage waveforms are sinusoidal and perfectly in phase, the power factor of the power converter is 1. In many parts of the world, legislative requirements for power converter manufacturers to ensure that power converters have power factors greater than 0.9. In high voltage applications the power converters typically have output power ratings of 75 Watts or more. Safety agencies generally require inclusion of PFC stages with converters with output power ratings of 75 Watts or higher.

There are generally two types of PFC stages that may be used with a power converter, namely a passive PFC circuit and an active PFC circuit. A passive PFC stage typically comprises of passive devices such as resistors, capacitors, and inductors. An active PFC circuit typically comprises of a combination of passive and active devices such as capacitors, inductors, and MOSFETS. More specifically, active PFC stages include buck converters, boost converters, or buck-boost converters. In high power applications, common methods to increase the power factor of a power converter include using an active PFC stage.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

Figure 1A:
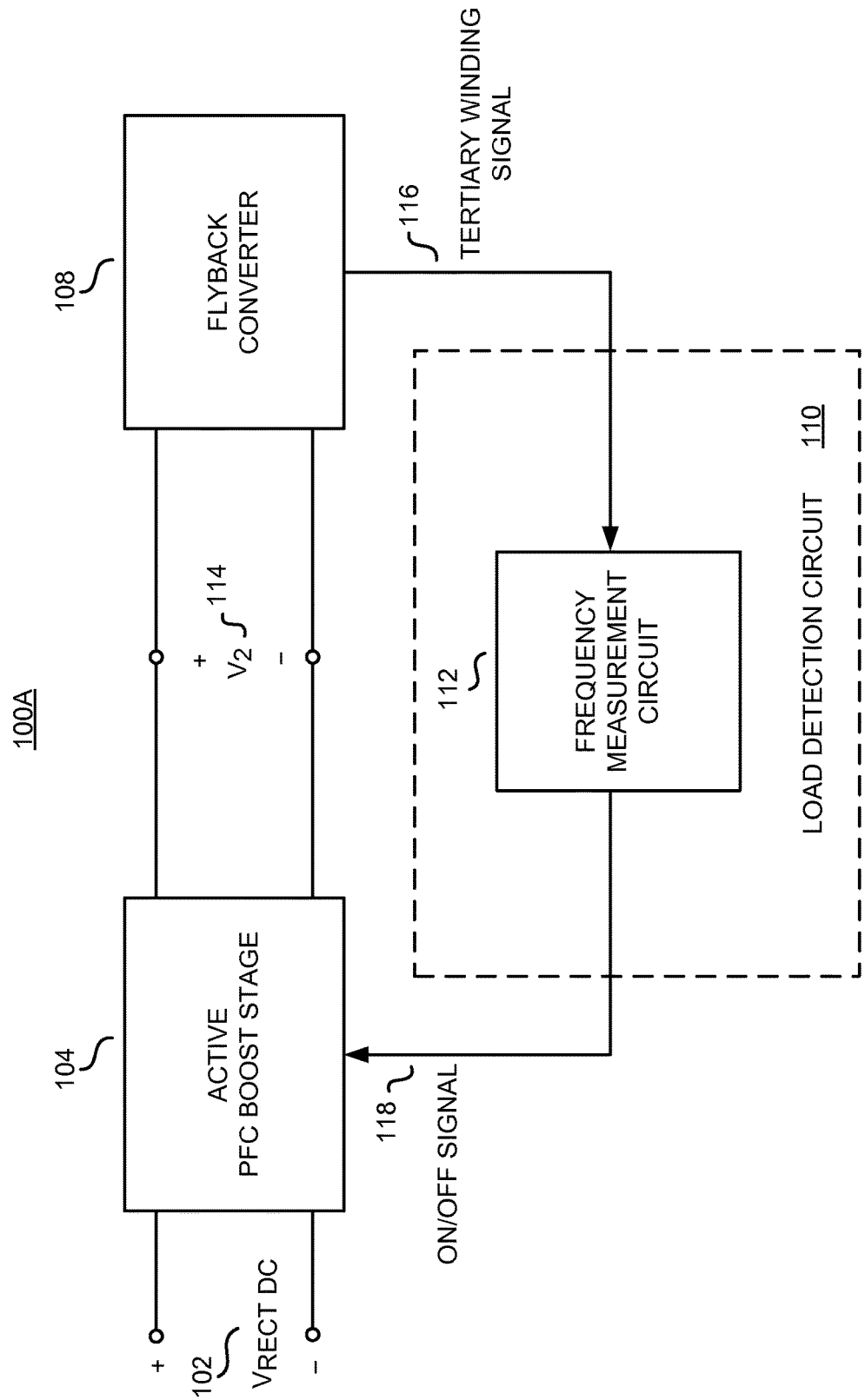
FIG. 1A is a functional block diagram of an example flyback converter including an active PFC boost stage, a load detection circuit, the load detection circuit further comprising a frequency measurement circuit in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As stated before, active PFC stages include active devices such as MOSFETs, which are operated in switching modes to achieve a desired PF value. An active PFC stage may improve the efficiency of a power converter particularly at high loads. However, the switching of the active devices included in the active PFC stages may result in a poor efficiency at light load or no load operations. Therefore, for power converters that use an active PFC stage, turning off the active PFC stage during light load or no load operations may greatly improve the efficiency of a power converter. In other words, selectively turning on the active PFC stage in response to various load conditions will enhance the efficiency of a power converter.

Described herein are embodiments of a power converter, a controller for a power converter, a load sense circuit, a frequency measurement circuit, and a bias supply circuit, that are to turn on or turn off the active PFC stage in response to detecting a load condition. More specifically, the present invention discloses an apparatus and a method to turn off the active PFC stage during light load or no load conditions. In the disclosed embodiment, the example power converter is a dc-dc power converter.

In one example, the active PFC stage may turned off at light load or no load conditions by decoupling or disconnecting the supply of power from a supply input to a PFC controller included in the active PFC stage. More specifically, in one example, the active PFC stage is turned off in response to detecting a light load or a no load condition, by providing a lower than a minimum operating supply voltage VCC_MIN, hereafter, VCC_MIN, to a supply input of the PFC controller included in the active PFC stage. In other embodiments, the active PFC stage may be turned off by decoupling or disconnecting the supply of power to the supply input of the PFC controller included in the active PFC stage either partially or fully. In other examples, turning off of the active PFC stage may be achieved by decoupling or disconnecting any other essential operating or controlling signal or input to any circuit in the active PFC stage.

In general, a load that draws maximum power from a power converter may be considered a full load or a maximum power load. In one example, a load that substantially draws 3%, 2.5%, or 1% less than the maximum power from a power converter may be considered a light load or a low load. In one example, a power consumption of 3%, 2.5%, or 1% less than a maximum power load by a power converter may be referred to as relatively low power consumption.

A load that consumes substantially negligible power compared to its maximum power rating from a power converter may be considered as substantially no load. When a power converter delivers maximum power to a load, it may be considered to be operating at a full load. When a power converter delivers a minimum power to a load, it may be considered to be operating at no load. When a power converter delivers less than maximum power but more than minimum power to a load, it may considered to be operating at a light load.

Control circuits for dc-dc power converters may vary the switching frequency of a dc-dc converter switch coupled to a control circuit, in response to changes in the load. Therefore, the switching frequency of the dc-dc converter switch may substantially represent an approximate range of values of power consumption of the load. When the power converter is operating at a full load, the switching frequency may be at its maximum value. When the power converter is operating at substantially no load, the switching frequency may be at a minimum value. When the power converter is operating at a light load, the switching frequency may be between the minimum and maximum values.

It is therefore appreciated that the present invention discloses a method and an apparatus to turn on or turn off an active PFC stage in response to a switching frequency of a dc-dc converter switch.

In the described example, a load sense circuit uses a voltage on a sense element to sense or detect an approximate switching frequency of a dc-dc converter switch. In the described embodiment, a voltage on the sense element may substantially represent the switching frequency of the power converter switch at any given time. In one example, the load sense circuit uses a voltage on the sense element to turn off the active PFC stage at a light load or no load condition. In one example, the load sense circuit may use a voltage on the sense element to turn on the active PFC stage at a load greater than light load.

Power converters that utilize a PFC stage (active or passive) may typically include a separate PFC stage, which may be coupled to an ac input via a rectifier. Such power converters are typically known as a dual stage or two stage power converters, a first stage or a front end stage being a PFC stage and the second stage or an output stage being a dc-dc converter stage or a dc-dc stage. In a typical configuration of a dual stage power converter, the output of the PFC stage may be coupled to the input of a dc-dc converter and the output of the dc-dc converter may drive a load.

Furthermore, if the front end stage is a PFC boost stage coupled to receive a dc input signal, then the output of the PFC boost stage may be a dc signal having a larger peak magnitude or amplitude. In other words, a PFC boost stage may convert a first dc signal to a second dc signal having larger peak magnitude or peak amplitude. Therefore, it should be noted that dual stage converters, which include a PFC boost stage as a front end stage, typically convert either the first DC signal or the second DC signal into a regulated DC output. The peak amplitude of the first dc signal may be referred to as a first peak amplitude, and the peak amplitude of the second dc signal may be referred to as a second peak amplitude.

It may be stated in a dual stage power converter, the PFC stage is configured in a first state to receive the first DC signal output from the rectifier and output a second DC signal having a larger peak amplitude than the first peak amplitude, and in a second state, receives the first DC signal and outputs a third DC signal having a smaller peak amplitude than the first peak amplitude. Furthermore, it may be appreciated that in a dual stage power converter, the output stage is coupled to receive either the second DC signal or the third DC signal from the PFC stage and output a regulated DC signal to power a load.

In a typical configuration of a dc-dc converter utilizing a PFC stage, the output of the dc-dc converter may be referred to as a load or a system output. Hereafter throughout the specification, the term 'load' will be used to refer to the load that is coupled to the system output.

It should be noted that the present invention relates to a dual stage power converter as described above. Additionally, the disclosed example invention may be used with any type of second stage dc-dc converter such as an isolated, a non-isolated, a forward, a flyback, a buck, a boost, or a resonant converter. Furthermore, it may include any type of active PFC stage such as an active PFC boost stage, an active PFC buck stage, or active PFC buck-boost stage etc.

An example the described embodiment includes a flyback converter as a second stage. Additionally, in the described example, the active PFC stage is a separate circuit external to the flyback converter. Thus, the apparatus and method described herein are especially useful when the active PFC stage is external to the power converter.

A flyback converter typically uses a controller to provide a regulated output to an electrical device (generally referred to as a load) by sensing and controlling the output of the power converter in a closed loop. More specifically, the controller may be coupled to a sensor that provides feedback information about the output of the power converter in order to regulate the output quantity delivered to the load. The controller regulates the output quantity delivered to the load by controlling a switch to turn on and off in response to the feedback information from the sensor to transfer energy pulses to the power converter output from a source of input power, such as a power line. The primary switch may be referred to as a dc-dc converter switch and the primary side controller may be referred to as to a dc-dc controller.

The sensor used in the power converter to provide the feedback information may include an opto-coupler that receives information about the output voltage directly from the output of the power converter. The output of the power converter is also coupled to a secondary winding of the energy transfer element. This type of control scheme is typically referred to as "secondary-side control." Another type of control scheme, commonly referred to as "primary-side control," may alternatively be utilized by the controller. In primary-side control, the sensor may include a primary-referenced winding (e.g., a bias winding) of the energy transfer element to provide a signal representative of the output voltage of the power converter immediately after a switching event that delivers energy to the output.

Various modes of control may be utilized to regulate the output of a power converter. In PWM mode the dc-dc controller regulates the output of the power converter by altering the duty ratio of the switch.

Another mode of control is known as ON/OFF control, which enables or disables a switching cycle. When a cycle is enabled, the switch may conduct current while the switch cannot conduct current during a disabled cycle. The dc-dc controller produces a sequence of enabled and disabled switching cycles to regulate the output of the power converter. For ON/OFF control, the controller generally receives a logic signal representative of the output of the power converter. In one example, the signal received by the controller may be a series of logic-level pulses, which would enable or disable the switch. In another example, the signal received by the controller may be a digital signal used for enabling or disabling the switch.

The present invention may be applicable to any type of the control schemes mentioned above. In an on/off control scheme, the switching frequency of the primary switch in a dc-dc converter may considered as the repetition rate of the dc-dc converter switch being turned on. The period between two consecutive times when the dc-dc converter switch is turned on or off may be referred to as a repetition time. The repetition time is inversely proportional to the repetition rate. In other words, if the repetition time is less, then the repetition rate is high. For the purpose of this specification the term repetition rate may be used to mean switching frequency.

As explained earlier, in the described example, a load sense circuit or circuitry senses a voltage on the sense element to detect the switching frequency of the dc-dc converter. In other words in the described example, an active PFC stage is turned off in response to a switching frequency of the dc-dc converter switch of the example flyback converter.

In other embodiments, the load sense circuitry may sense some other quantity such as a duty ratio of the dc-dc converter switch, which may represent a load condition. In one example, the load sense circuitry may include a frequency sense circuitry or a frequency measurement circuit to detect the switching frequency of the dc-dc converter switch at any given load. The frequency measurement circuit may include a sense element or a frequency sense element or dc-dc switching frequency sense element.

In one example, the sense element is a capacitor or a sense capacitor; which is coupled to charge or discharge to a voltage that is representative of the switching frequency of the dc-dc converter at a given load. In other examples the frequency sense circuitry may use a linear, a nonlinear, an active, or a passive electrical device as a sense element to generate a quantity such as a voltage or a current or a temperature which may be representative of the switching frequency of the dc-dc converter at a given load. Some examples of such elements include resistors, bipolar junction transistors, MOSFETs, and other.

As will discussed herein, in the described embodiment, the sense capacitor is charged and discharged to a certain voltage in response to a bias winding voltage or a bias winding current which may substantially represent the switching frequency of the dc-dc converter switch. The sense capacitor voltage $V_{SENSE}$, hereafter $V_{SENSE}$ is further used to turn the active PFC stage on or off.

FIG. 1A is a functional block diagram illustrating one example of a dc-dc power converter 100A that receives an input voltage $V_{RECT\_DC}$ 102 to produce an output voltage and an output current to a load (output voltage, output current, and the load are not shown in FIG. 1A). In an example of an ac-dc power converter, the dc input voltage $V_{RECT}$ 102 may be a rectified and filtered ac input voltage. The example dc-dc converter of FIG. 1A is a flyback converter 108. FIG. 1A also illustrates active PFC boost stage circuit 104. The active PFC boost stage circuit 104 may also be referred to as an active boost stage, a first stage, or a front end stage. The flyback converter 108 may also be referred to as a second stage or an output stage. A power converter having a front end stage and an output stage as described above may be referred to as a dual stage power converter. It should be noted that the present invention relates to a dual stage power converter as described above.

FIG. 1A also illustrates a load detection circuit or circuitry 110. The load detection circuit 110 may also be referred to as a light load detection circuit 110 or a light load sense circuitry 110. The output of the flyback converter 108 is coupled to the input of load detection circuit 110 via a tertiary winding signal 116. The output of the load detection circuit 110 is coupled to the active PFC boost stage circuit 104 via an on/off signal 118.

As will be described later, in the illustrated example at light load or no load operation, the load detection circuit 110 turns off the active PFC boost stage circuit 104 by disconnecting a supply of power to a supply input of a PFC controller (not shown in FIG. 1A) included in the active PFC boost stage 104, in accordance with the teachings of the present invention. The load detection circuit 110 turns on the active PFC boost stage circuit 104 when the load is greater than light load by connecting a supply of power to a supply input of a PFC controller (not shown in FIG. 1A) included in the active PFC boost stage 104, in accordance with the teachings of the present invention.

In one example, the load detection circuit 110 detects or senses the load (full load/light load/no load condition), by measuring the switching frequency of the dc-dc converter switch (not shown in FIG. 1A) of the flyback converter 108 via the tertiary winding signal 116 to sense the load condition. The load detection circuit 110 drives the on/off signal 118 high or low. The high and low values are logic high and logic low respectively. When the on/off signal 118 is at logic high, the active PFC boost stage 104 is turned on. When the on/off signal 118 is at logic low, the active PFC boost stage 104 is turned off.

Figure 1B:
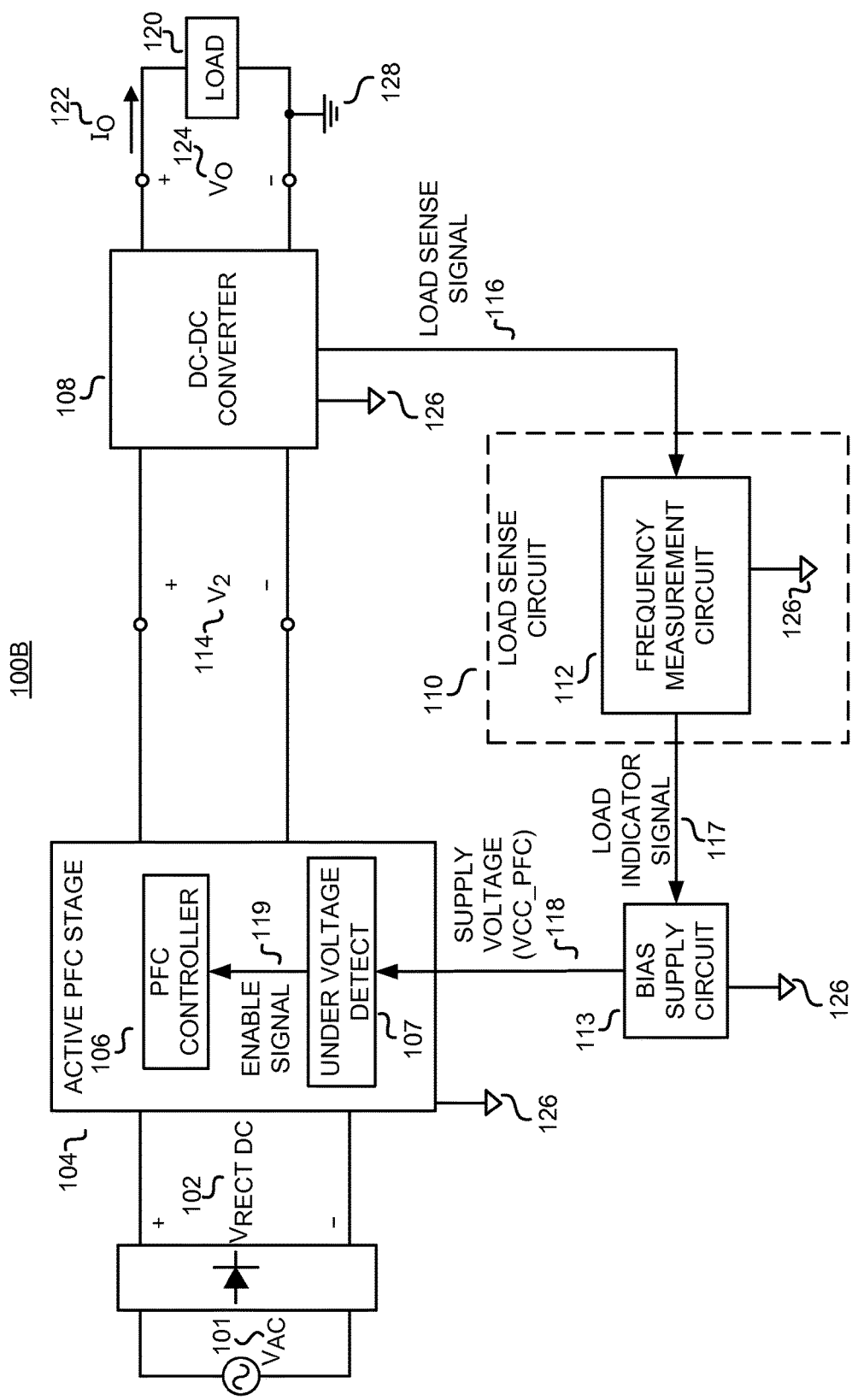
FIG. 1B is another functional block diagram of an example dc-dc converter including an active PFC stage, the active PFC stage further comprising a PFC controller and an under voltage detect circuit, a load sense circuit, the load sense circuit further comprising a frequency measurement circuit, and a bias supply circuit in accordance with the teachings of the present invention.

FIG. 1B is a another functional block diagram illustrating one example of a power converter 100B that receives an ac input voltage $V_{AC}$ 101 to produce an output voltage $V_O$ 124 and an output current $I_O$ 122 at a load 120. The ac input voltage $V_{AC}$ 101 is rectified and filtered to provide a dc input voltage $V_{RECT\_DC}$ 102 to the active PFC stage 104. In another example, the active PFC stage 104 may include a rectifier and a filter stage. An ac input voltage may also be referred to as an ac input signal or an ac input. The dc output voltage $V_O$ 124 may also be referred to as a dc output signal or a dc output. In the described embodiment, the ac input signal $V_{AC}$ 102 is a commercial line voltage between 90 volts and 264 volts (Vac) and the dc output is 12 volts and 24 volts. In another case the ac input voltage and dc output voltage may be different.

Input voltage $V_{RECT\_DC}$ 102 is positive with respect to an input return 126. Output voltage $V_O$ 124 is positive with respect to an output return 128.

FIG. 1B also illustrates an active PFC stage 104 including a PFC controller 106 and an under voltage detect circuit 107, a load sense circuit 110, the load sense circuit 110 further including a frequency measurement circuit 112, and a bias supply circuit 113. The output of the dc-dc converter 108 is coupled to the input of the frequency measurement circuit 112 via a load sense signal 116. The output of the frequency measurement circuit 112 is coupled to an input of the bias supply circuit 113 via a load indicator signal 117. The signal labeled as 'supply voltage 118' of the bias supply circuit 113 provides a supply voltage VCC_PFC to the under voltage detect circuit 107 as illustrated. Hereafter throughout the specification, the voltage at the signal supply voltage 118 will be referred to as VCC_PFC. The output enable signal 119 of the under voltage detect circuit 107 is further coupled to a supply input or a power supply of the PFC controller 106. The active PFC stage 104, the load sense circuit 110, and the bias supply circuit 113 are coupled to the input return 126. The dc-dc converter 108 is coupled to both the input return 126 and the output return 128. The load 120 is coupled to the output return 128.

In one example, the load indicator signal 117 may also be referred to as a load detection signal. The load sense circuit 110 may also be referred to as a load detection circuit or circuitry or a light load sense circuit or circuitry.

In the illustrated example, the load sense circuit 110 uses the bias supply circuit 113 to turn off the active PFC stage 104 at a light load or no load condition in accordance with the teachings of the present invention. The load sense circuit 110 uses the bias supply circuit 113 to turn on the active PFC stage 104 when the load is higher than a light load in accordance with the teachings of the present invention.

In operation, the load sense circuit 110 outputs the load indicator signal 117 or a light load sense signal 117 in response to sensing a load condition via the load sense signal 116. In one example, the load sense signal 116 can be a bias winding signal. The frequency measurement circuit 112 uses the load sense signal 116 to generate or to modify $V_{SENSE}$ in such a way that $V_{SENSE}$ is representative of the switching frequency of the dc-dc converter switch. The frequency measurement circuit 112 further outputs the load indicator signal 117, which is representative of the sense element voltage. In one example, the load indicator signal 117 is a voltage signal, which has a voltage equal to the $V_A$. In the described embodiment, the load indicator signal voltage $V_A$ 320 is equal to $V_{SENSE}$ 316. In other examples, the load indicator signal 117 can be some quantity such as a current signal or a logic signal derived from $V_{SENSE}$ 316.

Furthermore, if the voltage $V_A$ 320 is equal to or greater than a first threshold voltage $V_{TH}$ or light load threshold voltage $V_{TH}$, hereafter, $V_{TH}$ then the VCC_PFC is substantially equal to the VCC_MIN of the PFC controller 106. In other words, if $V_{SENSE}$ 316 is equal to or greater than $V_{TH}$, then the VCC_PFC is substantially equal to the VCC_MIN of the PFC controller 106. Thus, the light load threshold voltage $V_{TH}$ is the minimum voltage $V_A$ 320 of the load indicator signal required to turn on the PFC controller 106.

In operation, the under voltage detect circuit 107 includes circuitry (not described in this specification) senses the VCC_PFC. If the VCC_PFC is equal to or greater than the VCC_MIN of the PFC controller 106, then the under voltage detect circuit 107 makes the enable signal high. If the VCC_PFC is lower than the VCC_MIN of the PFC controller, then the under voltage detect circuit 107 makes the enable signal low. In the described embodiment the enable signal 119 is a logic signal. When the enable signal 119 is high, the PFC controller 106 is turned on and when the enable signal 119 is low, the PFC controller 106 is turned off.

In the described example, the active PFC stage 104 is turned off when the switching frequency of the dc-dc converter switch (shown in FIG. 3) is 250 Hz or less. In another example the active PFC stage 104 may be turned off when the switching frequency of the dc-dc converter switch (shown in FIG. 3) is more than or equal to 250 Hz. In some other examples, the active PFC stage may be turned on or off for a different frequency threshold.

Figure 2:
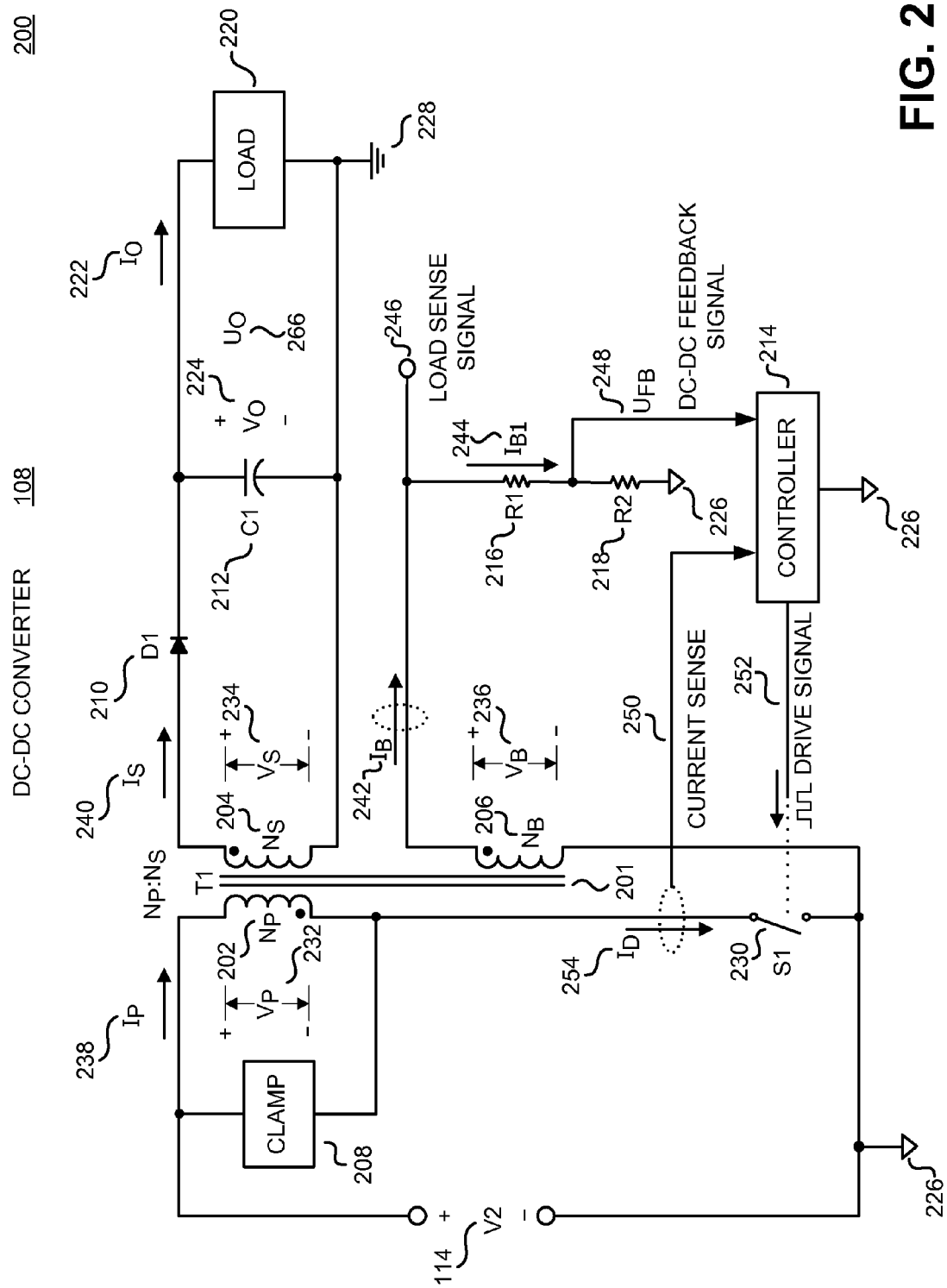
FIG. 2 illustrates an example dc-dc converter in accordance with the teachings of the present invention.

FIG. 2 is a functional block diagram 200 illustrating one example of a second stage power converter, which is a dc-dc converter 108. In the depicted example, the dc-dc converter 108 is a flyback converter. The dc-dc converter 108 provides output power to a load 220 from a regulated dc input voltage V2 114. In the depicted example, the regulated dc input voltage V2 114 is the output of the active PFC stage 104. The dc input V2 114 further couples to the energy transfer element T1 201. In some examples, the energy transfer element T1 201 may be a coupled inductor, a transformer, or an inductor. The example energy transfer element T1 201 shown includes three windings, a primary winding 202, a secondary winding 204, and a bias winding 206. The power converter utilizes the energy transfer element T1 201 to transfer energy between the primary winding 202 and the secondary winding 204. The primary winding 202 is coupled to the power switch S1 230 and the switch S1 230 is further coupled to an input return 226.

In addition, the clamp circuit 208 is illustrated as coupled across the primary winding 202 to limit the maximum voltage on the switch S1 230. Secondary winding 204 is coupled to the rectifier D1 210, which is exemplified as a diode. However, the rectifier D1 210 may be a transistor used as a synchronous rectifier. Output capacitor C1 212 is shown as being coupled to the rectifier D1 210 and the output return 228. The power converter further includes circuitry to regulate the output, which is exemplified as output quantity $U_O$ 266. In general, the output quantity $U_O$ 266 is an output voltage $V_O$ 224, an output current $I_O$ 222, or a combination of the two.

As shown, a controller 214 is coupled to receive a dc-dc feedback signal $U_{FB}$ 248. The controller may further include a sense circuit, which may be coupled to sense the output quantity $U_O$ 266 and to provide a dc-dc feedback signal $U_{FB}$ 248, which is representative of the output quantity $U_O$ 266. The sense circuitry may rely on a sense signal, which may be representative of the conditions of the power converter which may relay when the power converter is in a low limit condition. Examples of such conditions could be the average input voltage V2 114, RMS current, or the switching frequency of the switch S1 230. Temperature of various components, such as the energy transfer element T1 201 or the output rectifier 210, may also be used to relay when the power converter is in a low limit condition.

The controller 214 further includes terminals for receiving switch current sense signal 250 and for providing the drive signal 252 to the power switch S1 230. The switch current sense signal 250 may be representative of the switch current ID 254 in the power switch S1 230. The controller 214 provides the drive signal 252 to the power switch S1 230 to control various switching parameters to control the transfer of energy from the input of power converter to the output of power converter. Examples of such parameters may include switching frequency (or period), duty cycle, ON and OFF times of the power switch S1 230, or varying the number of pulses per unit time of the power switch S1 230.

Switch S1 230 is opened and closed in response to the drive signal 252. In operation, the switching of the switch S1 230 produces a pulsating current at the rectifier D1 210. The secondary winding current is filtered by the output capacitor C1 212 to produce a substantially constant output voltage $V_O$ 224, output current $I_O$ 222, or a combination of the two. In one example, the switch S1 230 may be a transistor such as a metal-oxide-semiconductor field-effect transistor (MOSFET). In another example, controller 214 may be implemented as a monolithic integrated circuit or may be implemented with discrete electrical components or a combination of discrete and integrated components. Controller 214 and switch S1 230 could form part of an integrated circuit that is manufactured as either a hybrid or monolithic integrated circuit.

One end of the bias winding 206 is coupled as a load sense signal 246 to the frequency measurement circuit 112 as shown later in FIG. 3A. In practice, the controller 214 may provide the bias winding voltage or its representative on a terminal, which can be used as load sense signal 246. The resistors R1 216 and R2 218 are coupled as a potential divider circuit between the bias winding 206 and the input return 226. The potential divider circuit is also coupled to provide the dc-dc feedback signal $U_{FB}$ 248 to the controller 214. As illustrated, the bias winding current $I_B$ 242 flows through the bias winding 206. A portion $I_{B1}$ 244 of the bias winding current $I_B$ 242 may flow through the potential divider circuit formed by R1 216 and R2 218.

The switching frequency of the dc-dc converter switch S1 230 is greater for heavier loads than at lighter loads. Typically, the switching frequency is varied by varying the duration of the on-time and the off-time in response to the load. In the described example, the switching frequency of the dc-dc converter switch S1 230 is varied by increasing the off time ($T_{OFF}$), or decreasing the on time ($T_{ON}$), as the load becomes lighter.

When the dc-dc converter switch S1 230 is on (closed), the primary winding voltage $V_P$ 232 is positive with respect to the input return 226. When the dc-dc converter switch S1 230 is off (open), the primary winding voltage $V_P$ 232 is negative with respect to the input return 226. During light load or no load operations, the dc-dc converter switch S1 230 is off for a longer time than during heavier load operations.

The bias winding voltage $V_B$ 236 further couples to generate a voltage on the sense capacitor included in the frequency measurement circuit 112. In general, a positive bias winding voltage $V_B$ 236 charges the sense capacitor whereas the sense capacitor discharges during negative bias winding voltage $V_B$ 236. The time for which the sense capacitor is substantially charged due to a positive bias winding voltage may be referred to as a charge time. The time for which the sense capacitor is substantially discharged during a negative bias winding voltage may be referred to as a discharge time. In the described example, during heavier load operations the time available for the sense capacitor charging is greater than the time available for sense capacitor discharge. Conversely, during light load or no load operations, the time available for the discharge of sense capacitor is greater than time available for its charging. Furthermore, the time available for discharge of the sense capacitor during light load or no load operations is greater than during heavier loads.

Therefore, the average voltage across the sense capacitor will be larger during heavier load operations than for light or no load operations. As will be discussed later with respect to FIGS. 3A and 3B, in the present embodiment the active PFC stage 104 is turned on or off in response to an average value of voltage on the sense capacitor $V_{AVG}$, also referred to as an average sense capacitor voltage or $V_{SENSE\_AVG}$. In other words, the PFC controller 106 is turned on or off in response to $V_{SENSE\_AVG}$.

Figure 3A:
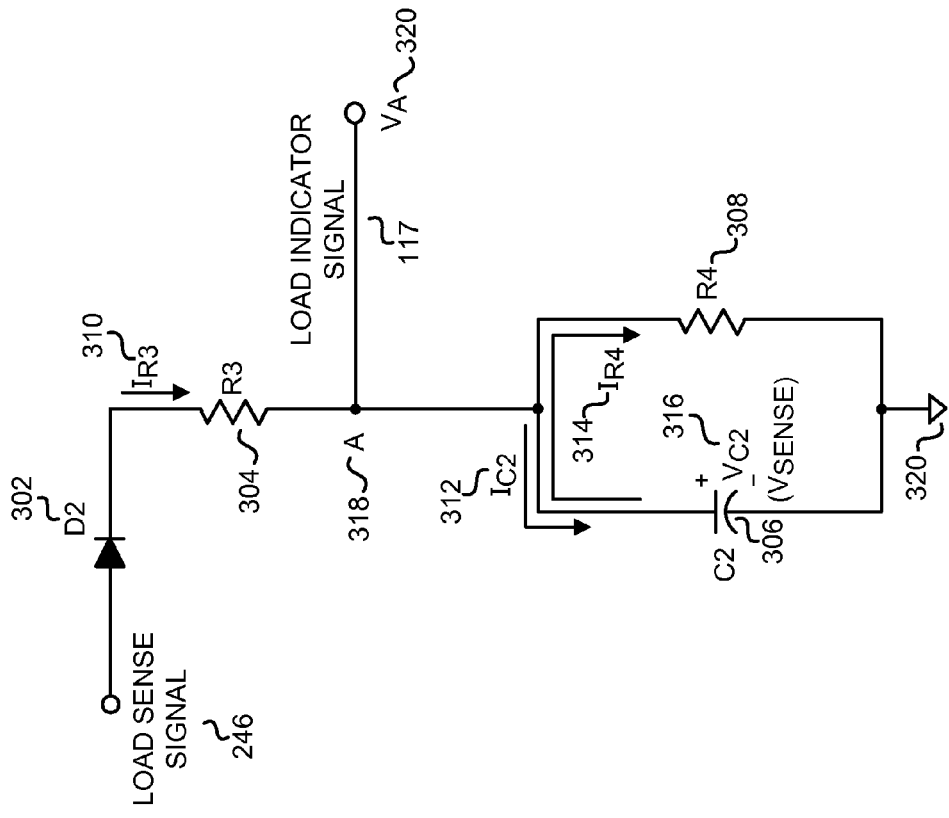
FIG. 3A illustrates an example frequency measurement circuit in accordance with the teachings of the present invention.

FIG. 3A illustrates a circuit diagram 300A of an example frequency measurement circuit 112, a diode D2 302, resistors R3 304, R4 308, a sense capacitor C2 306, a node A 318, and the input return 320. The example frequency measurement circuit 112 the load sense signal 246 as an input.

Also shown in FIG. 3A are a current $I_{R3}$ 310 through resistor R3 304, a current $I_{C2}$ 312 through sense capacitor C2 306, a current $I_{R4}$ 314 through resistor R4 308, a $V_{C2}$ 316, and a load indicator signal 117. In illustrated example of FIG. 3A, the sense capacitor voltage $V_{C2}$ 316 may be referred to as $V_{SENSE}$ 316.

In the described embodiment, the load indicator signal 117 is a voltage signal, having a voltage $V_A$. If $V_A$ 320 has a voltage equal to or greater than $V_{TH}$, then the active PFC stage 104 is turned on. If the load indicator signal 117 has a voltage less than $V_{TH}$, then the active PFC stage 104 is turned off or not allowed to be turned on.

In operation, if $V_{SENSE}$ 316 is less than a first threshold voltage or a $V_{TH}$, then the frequency measurement circuit 112 alters the voltage on a load indicator signal 117. As will be described herewith, in the present embodiment, the load indicator signal 117 controls the minimum regulated supply voltage VCC_MIN to the PFC controller 106 via the transistor Q2 356 and the load indicator signal 117.

Referring briefly to FIG. 2, when the bias winding voltage $V_B$ 236 is at a nonzero positive value with respect to the input return 226, hereafter nonzero positive, the load sense signal 246 is also at a nonzero positive value with respect to the input return 226 or 320 of FIG. 3.

At this time, a portion $I_{C2}$ 312 of current $I_{R3}$ 310 charges the sense capacitor C2 306. The current $I_{C2}$ 312 may be referred to as a charge current. Some portion of the current $I_{R3}$ 310 may also flow through the resistor R4 308. When the bias winding voltage $V_B$ 236 is at a nonzero negative value, hereafter nonzero negative, the load sense signal 246 is also at a nonzero negative value with respect to the input return 320. At this time, the diode D2 304 is reverse biased and substantially prevents current flow of $I_{R3}$ 310 through the resistor R3 304 in the direction shown. Thus, the charge current $I_{C2}$ 312 is substantially zero and the sense capacitor C2 306 discharges through the resistor R4 308. The current $I_{R4}$ 314 through R4 308 may be referred to as a discharge current.

When the load sense signal 246 is at a nonzero positive value, the $V_{SENSE}$ 316 continues to increase as long as the charge current $I_{C2}$ 312 is greater than discharge current $I_{R4}$ 314. During a complete switching cycle ($T_{ON}+T_{OFF}$) of the dc-dc converter switch S1 230, the sense capacitor C2 306 charges and discharges. The discharge current $I_{R4}$ 314 may be substantially proportional to the voltage across the parallel combination of the resistor R4 308 and the sense capacitor C2 306. At any given instant in time, the charge current $I_{C2}$ 312 may be substantially proportional to the difference between the positive bias winding voltage $V_B$ 236 and the voltage $V_{SENSE}$ 316 across the sense capacitor C2 306. Therefore, when $V_{SENSE}$ 316 is zero, the charge current $I_{C2}$ 312 is maximized and the discharge current $I_{R4}$ 314 is minimized. As the $V_{SENSE}$ 316 gradually increases, the charge current $I_{C2}$ 312 is reduced whereas the discharge current $I_{R4}$ 314 is increased. In this way the $V_{SENSE}$ 316 can charge quickly from substantially a zero value.

Additionally, the positive bias winding voltage $V_B$ 236 remains substantially constant with respect to a given load. Therefore, the total charge imparted by current $I_{R3}$ 310 into the sense capacitor C2 306 during each switching cycle can be considered to be generally constant maintaining an average value $V_{SENSE\_AVG}$ of the $V_{SENSE}$ 316, hereafter, $V_{SENSE\_AVG}$. In order to increase the $V_{SENSE\_AVG}$, a continued increase in the current $I_{R3}$ 310 is required and to decrease the $V_{SENSE\_AVG}$, a continued decrease in the current $I_{R3}$ 310 is required. As the switching frequency or the repetition rate of the dc-dc converter switch 230 increases, the current $I_{R3}$ 310 is increased causing the $V_{SENSE}$ 316 to increase. Thus, the $V_{SENSE\_AVG}$ is also increased. As the switching frequency or the repetition rate of the dc-dc converter switch decreases, the current $I_{R3}$ 310 is decreased causing the $V_{SENSE}$ 316 to decrease. Thus the $V_{SENSE\_AVG}$ is also decreased.

Because of the above operation, a voltage $V_A$ 320 is developed at the node A 318 which manifests the load indicator signal 117 which is further coupled to the bias supply circuit 113. In the described embodiment, the voltage $V_A$ 320 may be substantially equal to the $V_{SENSE}$ 316 at a given load. Additionally, the voltage $V_A$ 320 may be substantially equal to the $V_{SENSE\_AVG}$ at a given load.

Figure 3B:
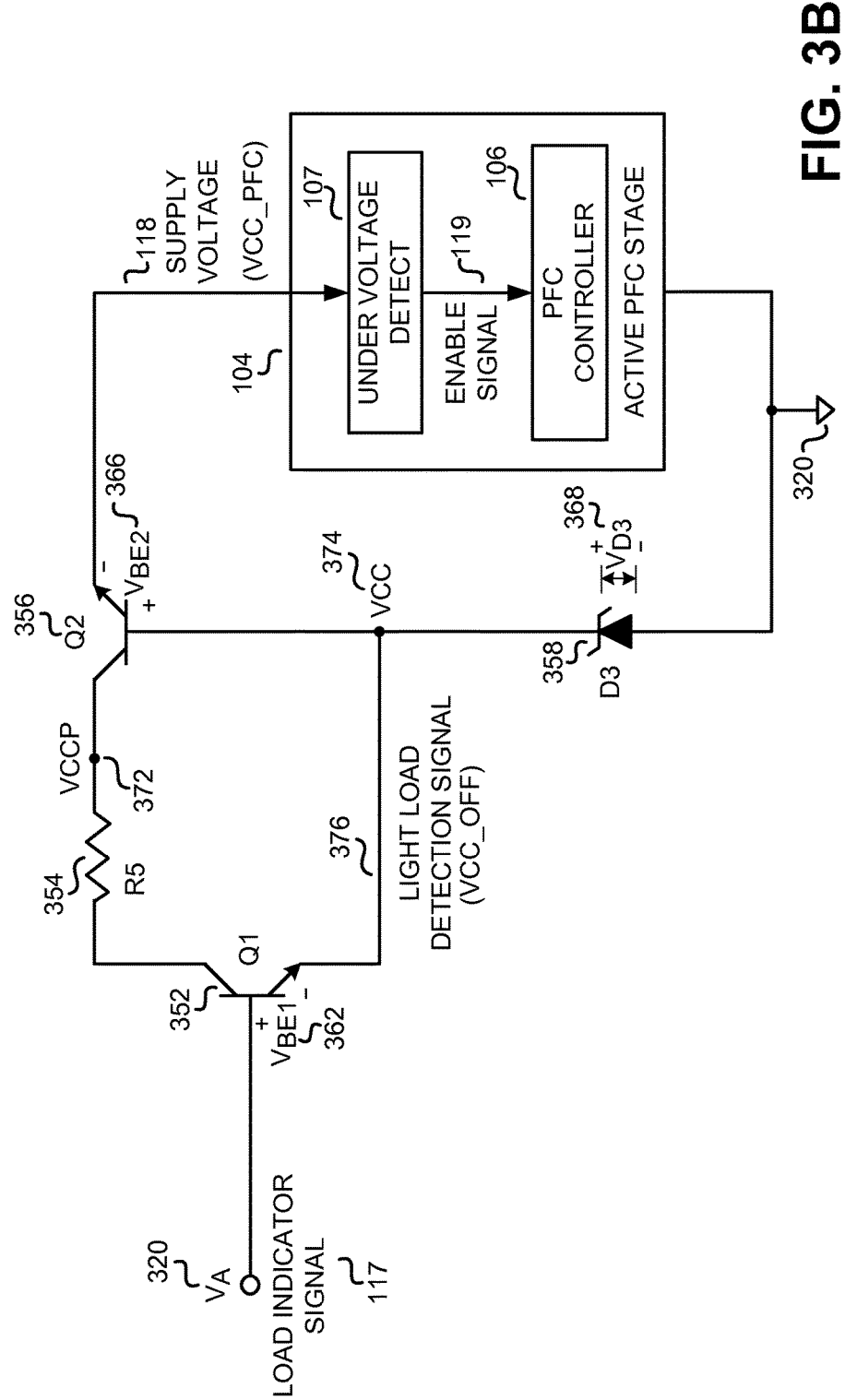
FIG. 3B illustrates an example bias supply circuit in accordance with the teachings of the present invention.

Therefore, it may be appreciated that if $V_{SENSE}$ 316 is equal to greater than a $V_{TH}$, then the bias supply circuit of FIG. 3B will provide the VCC_MIN to the PFC controller 106 and the active PFC stage 104 will be turned on. If $V_{SENSE}$ 316 is lower than a $V_{TH}$, then the bias supply circuit of FIG. 3B will provide a lower voltage that the VCC_MIN to the PFC controller and the active PFC stage 104 will be turned off.

FIG. 3B illustrates a circuit diagram 300B of an example bias supply circuit 113, a first transistor Q1 352, a resistor R5 354, a second transistor Q2 356, a zener diode D3 358, the active PFC stage 104, a first node VCCP 372, a second node VCC 374, and the input return 320. The example bias supply circuit 113 receives the load indicator signal 117 as an input.

Also shown in FIG. 3B are a minimum base-to-emitter voltage (turn on voltage) $V_{BE1}$ 362 of the first transistor Q1 352, a minimum base-to-emitter voltage (turn on voltage) $V_{BE2}$ 366 of the second transistor Q2 356, and the zener diode voltage $V_{D3}$ 368. In the described embodiment, the transistors Q1 352 and Q2 356 are bipolar junction transistors. In other embodiments, the transistors Q1 352 and Q2 356 may be MOSFETs or any other suitable transistor configurations.

The collector of the first transistor Q1 352 is coupled to the first node VCCP 372 via a resistor R5 354. In one example, first node VCCP 372 is coupled to receive a rectified and filtered dc voltage which may be derived from the bias winding voltage. In other examples, the first node VCCP 372 may be coupled to receive a dc voltage from another source. The resistors R5 354 is a current limit resistor or biasing resistor typically included for normal operation of the first transistor Q1 352. The emitter of the first transistor Q1 352 is further coupled to the cathode terminal of the zener diode D3 358 and the base of the second transistor Q2 356 via a node 374. The collector of the transistor Q2 is coupled to a node VCCP 372. In another embodiment the emitter of the first transistor Q1 352 may be coupled to the node VCC 374 via a current limit resistor or any other current limit circuit.

In one example, the active PFC stage 104 is turned on or off in response to the voltage $V_A$ 320 of the load indicator signal 117. The emitter of the second transistor Q2 356 provides a supply of power or the supply voltage to the PFC controller 106. The emitter of the second transistor Q2 356 is further coupled to the under voltage detect circuit 107 included in the active PFC stage 104 via a supply voltage 118 signal. The output of the under voltage detect circuit 107 turns the PFC controller 106 on or off via the enable signal 119. In other words, the emitter of the second transistor Q2 356 may be considered as a supply input of the PFC controller 106 which is coupled to the PFC controller 106 via the under voltage detect circuit 107.

In the described embodiment, the under voltage detect circuit 107 is external to the PFC controller 106. In other embodiments, the under voltage circuit 107 may be integrated with the PFC controller 106.

It may be understood from the circuit arrangement of FIG. 3B that when the active PFC stage 104 is on, a regulated voltage of a value equal to VCC is provided by the zener diode D3. As explained earlier, the light load threshold voltage or the minimum voltage to turn on the PFC controller 106 may be given by:

$$V_{TH} = VCC\_MIN + V_{BE2} + V_{BE1}$$

As explained earlier, in the described embodiment, $V_A$ 320 is compared to the value $V_{TH}$ in order to turn on the PFC controller on or off. In other words, $V_{TH}$ is measured at the load indicator signal 117.

Referring briefly to FIG. 3A and the above equation, it may understood that if the $V_{SENSE}$ 316 is equal to or greater than the $V_{TH}$, then the active PFC stage 104 is turned on. If the $V_{SENSE}$ 316 is lower than the $V_{TH}$, then the active PFC stage 104 is turned off.

In one example, if the $V_{SENSE}$ 316 is lower than the $V_{TH}$, then the first transistor Q1 352 or the second transistor Q2 356 may not be turned on. In another embodiment, when the $V_{SENSE}$ 316 is lower than the $V_{TH}$, the first transistor Q1 352 or the second transistor Q2 356 may be fully or partially conducting at the same time or at different times, however, the inclusion of other circuit elements may make VCC_PFC 118 lower than the VCC_MIN of the PFC controller 106.

In yet another embodiment, the first transistor Q1 352 and the second transistor Q2 356 may be configured as switches to modify the value of VCC_PFC in order to supply VCC_MIN or disconnect VCC_MIN from a supply input to the PFC controller 106.

In one example, a light load detection signal VCC_OFF 376 is output onto the node VCC 374. The light load detection signal VCC_OFF 376, hereafter, signal VCC_OFF 376, may also be referred to as a low load signal. In the described embodiment, signal VCC_OFF 376 is a voltage signal and has a value substantially equal to the voltage at the emitter of the first transistor Q1 352. Thus, if the $V_{SENSE}$ 316 is equal to or greater than the $V_{TH}$, then the signal VCC_OFF 376 provides enough base voltage to the second transistor Q2 356 to make the VCC_PFC equal to or greater than the VCC_MIN of the PFC controller 106. This further causes the under voltage detect circuit 107 to make the enable signal 119 high and turn on the PFC controller 106. The active PFC stage 104 is thus turned on.

If the $V_{SENSE}$ 316 is lower than the $V_{TH}$, then the signal VCC_OFF 376 may not provide enough base voltage to the second transistor Q2 356 to make VCC_PFC equal to or greater than the VCC_MIN. Therefore, the VCC_PFC has a voltage lower than the VCC_MIN which causes the under voltage detect circuit 107 to make the enable signal 119 low and turn off the PFC controller 106. The active PFC stage 104 is thus turned off. Thus, it may be appreciated that the second transistor Q2 356 is responsive to the light load detection signal VCC_OFF 376 to disconnect a supply of power from the supply input of the power factor correction controller 106.

Furthermore, if VCC_OFF 376 is equal to or greater than a second threshold voltage or light load detection threshold voltage $V_{TH}$ DETECT, hereafter $V_{TH\_DETECT}$, then VCC_PFC is equal to or greater than VCC_MIN of the PFC controller 106 and the active PFC stage 104 is turned on. If VCC_OFF 376 is lower than the $V_{TH\_DETECT}$, then VCC_PFC is lower than VCC_MIN of the PFC controller 106 and the active PFC stage 104 will be turned off.

In another embodiment the signal VCC_OFF 376, may be a current signal or a logic signal representative of voltage at the emitter of the first transistor Q1 352 or any of the voltages such $V_{SENSE}$ 316, $V_{TH}$.

In an embodiment where the signal VCC_OFF 376 is a logic signal, it may have either a high or a low value. In such an embodiment, the high and low value of the VCC_OFF 376 may connect or disconnect the supply of power from a supply input to the PFC controller 106.

As explained earlier, in an embodiment of the present invention without the under voltage detect circuit 107, the second transistor Q2 356 may be directly coupled to a supply input of the PFC controller 106. In such an embodiment, the signal VCC_OFF 376 may be used to turn off the second transistor Q2 356 to disconnect the supply of power from the supply input of PFC controller 106; or to turn on the second transistor Q2 356 to connect the supply of power to the supply input of PFC controller 106.

As explained earlier, during heavier load operations or at higher switching frequencies of the dc-dc converter switch 230, the $V_{SENSE\_AVG}$ is equal to or greater than the $V_{TH}$; therefore, the active PFC stage will be turned on. During light load or no load operations or at lower switching frequencies of the dc-dc converter switch 230, the $V_{SENSE\_AVG}$ is less than the $V_{TH}$; therefore, the active PFC stage will be turned off.

Figure 4:
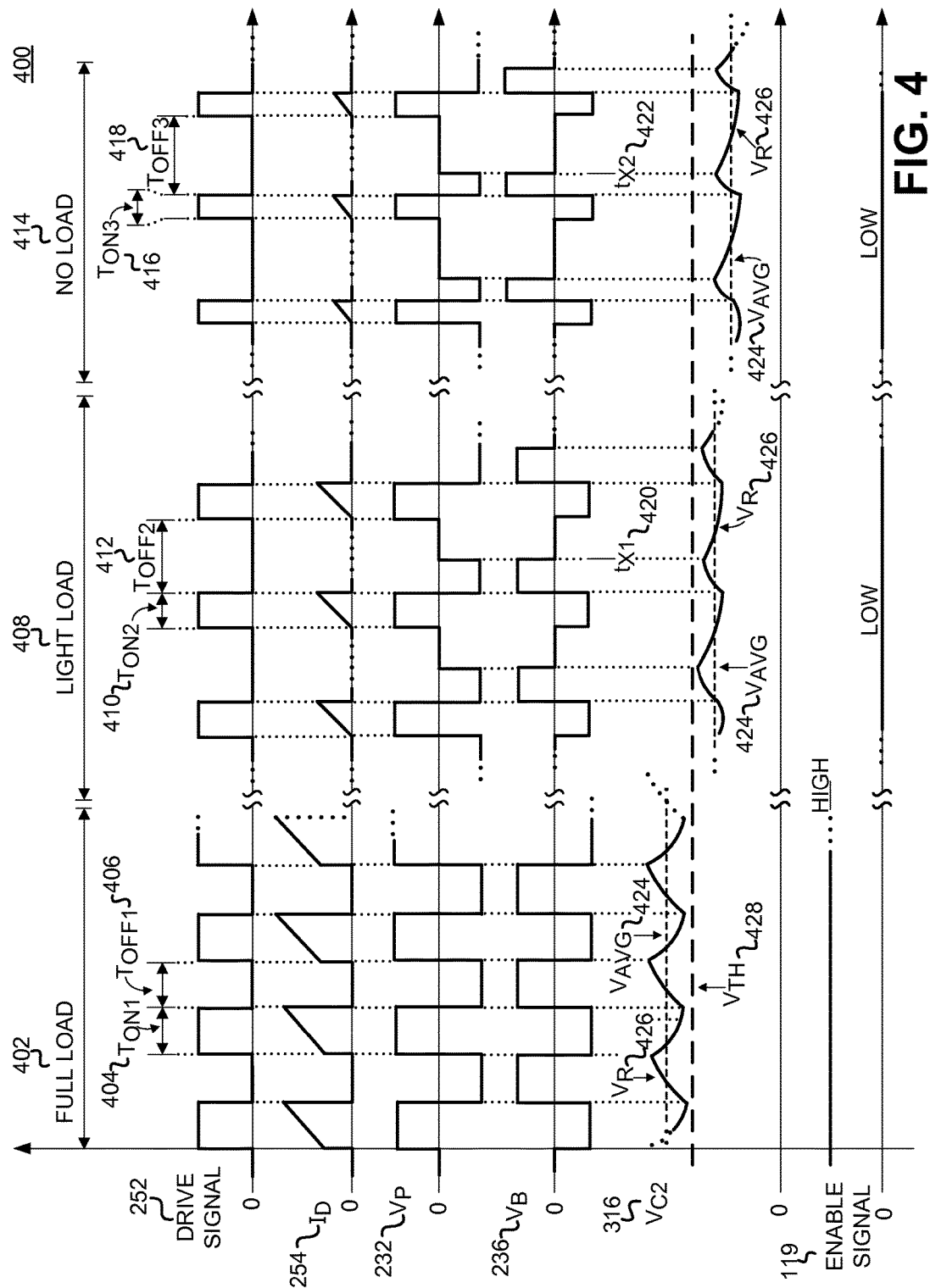
FIG. 4 illustrates a timing diagram of example waveforms of various signals of the example power converter of FIG. 2, the example frequency measurement circuit of FIG. 3A, and the example bias supply circuit of FIG. 3B in accordance with the teachings of the present invention.

FIG. 4 illustrates a timing diagram 400 of example waveforms of various signals of the example power converter including an active PFC stage in accordance with the teachings of the present invention. Three operation modes, FULL LOAD 402, LIGHT LOAD 408, and NO LOAD 414 are illustrated in FIG. 4.

The operation mode FULL LOAD 402, hereafter FULL LOAD 402, may represent an operation of the dc-dc converter 108 at a full load or at any load that is greater than a light load. The operation mode LIGHT LOAD 408, hereafter LIGHT LOAD 408, may represent an operation of the dc-dc converter 108 at a light load. The operation mode NO LOAD 414, hereafter NO LOAD 414, may represent an operation of the dc-dc converter 108 at no load or substantially no load. It should also be noted that FULL LOAD 402, LIGHT LOAD 408, and NO LOAD 414 illustrate operation of the circuit elements of FIGS. 2, 3A, and 3B under steady state load conditions.

FULL LOAD 402 further illustrates a period during which the dc-dc converter switch is turned on ($T_{ON1}$ 404) and a period during which the dc-dc converter switch is turned off $T_{OFF1}$ 406. Similarly, LIGHT LOAD 408 illustrates a period during which the dc-dc converter switch is turned on ($T_{ON2}$ 410) and a period during which the dc-dc converter switch is turned off $T_{OFF2}$ 412. NO LOAD 414 illustrates a period during which the dc-dc converter switch is turned on ($T_{ON3}$ 416) and a period during which the dc-dc converter switch is turned off ($T_{OFF3}$ 418).

As can be seen, $T_{ON1}$ 404 is greater than the $T_{ON2}$ 410, which is further greater than TONS 414. Also $T_{OFF1}$ 406 is less than $T_{OFF2}$ 412, which is further less than $T_{OFF3}$ 418.

To illustrate, during $T_{ON1}$ 404, drive signal 252 for dc-dc converter switch S1 230 is high, which turns dc-dc converter switch S1 230 on. At this time the dc-dc converter switch current ID 254 in the primary winding 202 continues to increase. A positive non-zero voltage $V_P$ 232 with respect to input return 226 appears at the primary winding 202 and a negative voltage $V_B$ 236 appears at the bias winding 206 with respect to input return 226.

For the purpose of explanation, it is assumed that before the beginning of $T_{ON1}$ 404, the dc-dc converter 108 may be operating at a full load or a load greater than a light load. Therefore, at the beginning of $T_{ON1}$ 404, the $V_{SENSE}$ 316 may be greater than the light load threshold voltage $V_{TH}$ 428 resulting from the previous switching periods. Therefore, the enable signal 119 is high or on at the beginning of $T_{ON1}$ 404.

At the beginning of $T_{ON1}$ 404, the sense capacitor C2 306 may begin to discharge as the bias winding voltage $V_B$ 236 is at a nonzero negative value with respect to the input return 226. Until the end of $T_{ON1}$ 404, the $V_{SENSE}$ 316 may decrease to a value, which is substantially equal to or greater than the light load threshold voltage $V_{TH}$ 428. More specifically, until the end of $T_{ON1}$ 404, the $V_{SENSE}$ 316 may not have decreased to a value lower than the light load threshold voltage $V_{TH}$ 428.

At the end of $T_{ON1}$ 404, the drive signal 252 becomes low, the voltage $V_P$ 232 at the primary winding 202 becomes zero, and a positive non-zero voltage $V_B$ 236 with respect to input return 226 appears at the bias winding 206.

At the beginning of $T_{OFF1}$ 406 the bias winding current $I_B$ 242 starts to increase. A current $I_{R3}$ 310 flows through the resistor R3 304 and a charge current $I_{C2}$ 312 charges the sense capacitor C2 306 further increasing the $V_{SENSE}$ 316. At the end of $T_{OFF1}$ 406, the drive signal 252 becomes high again turning the dc-dc converter switch S1 230 on. The duration of $T_{OFF1}$ is not long enough to allow the $V_{SENSE}$ 316 to decrease to a value lower than the light load threshold voltage $V_{TH}$ 428. $V_R$ 426 represents the ripple voltage on the sense capacitor C2 306 resulting from the charging and discharging. The average value $V_{SENSE\_AVG}$ 424 of the $V_{SENSE}$ 316 remains equal to or above the light load threshold voltage $V_{TH}$ 428. This causes the enable signal 119 to remain on or HIGH. The charging and discharging of the sense capacitor may continue for the rest of the switching periods of the dc-dc converter switch S1 230.

Referring now to the LIGHT LOAD 408 operation mode, during $T_{ON2}$ 410 and $T_{OFF2}$ 412, various circuit elements of FIG. 2, FIG. 3A, and FIG. 3B behave in a manner substantially similar to the FULL LOAD operation mode.

For the purpose of explanation, it is assumed that before the beginning of $T_{ON2}$ 410, the dc-dc converter 108 may have operating at a light load. Therefore, at the beginning of $T_{ON2}$ 410, the $V_{SENSE}$ 316 may be lower than the light load threshold voltage $V_{TH}$ 428 from the previous switching periods.

At the beginning of $T_{ON2}$ 410, a positive non-zero voltage $V_P$ 232 with respect to input return 226 appears at the primary winding 202 and a negative voltage $V_B$ 236 of the same magnitude appears at the bias winding 206 with respect to input return 226. Therefore, the enable signal 119 is off or low at the beginning of $T_{ON2}$ 410. The $V_{SENSE}$ 316 continues to decrease to even a lower value until the end of $T_{ON2}$ 410.

At the beginning of $T_{OFF2}$ 412, the drive signal 252 becomes low turning the dc-dc converter switch S1 230 off and the bias winding voltage $V_B$ 236 has a positive non-zero value. At this time the sense capacitor C2 306 starts to charge because of the charge current $I_{C2}$ 312. The sense capacitor C2 306 continues to charge until time $t_{x1}$ 420. However, the $V_{SENSE}$ 316 may only increase to a value, which is less than the light load threshold voltage $V_{TH}$ 428.

At time $t_{x1}$ 420, $V_{SENSE}$ 316 starts to decrease as the bias winding voltage $V_B$ 236 decreases substantially to zero. In operation, the sense capacitor C2 306 will begin to discharge when the bias winding voltage $V_B$ 236 becomes lower than the $V_{SENSE}$ 316. $V_R$ 426 is the ripple voltage on the sense capacitor C2 306 resulting from its charging and discharging. Since the $V_{SENSE}$ 316 may substantially remain below for several such periods during LIGH LOAD 408 operation, the average value $V_{SENSE\_AVG}$ 424 of the $V_{SENSE}$ 316 may substantially remain lower than the light load threshold voltage $V_{TH}$ 428. This causes the enable signal 119 to remain off or LOW, which further prevents the active PFC stage in 104 from turning on.

Referring now to the NO LOAD 414 operation, during TONS 416 and $T_{OFF3}$ 418, various circuit elements of FIG. 2, FIG. 3A, and FIG. 3B behave in a manner substantially similar to the LIGHT LOAD 408 operation.

For the purpose of explanation, it is assumed that before the beginning of $T_{ON2}$ 410, the dc-dc converter 108 may have operating at substantially no load. Therefore, at the beginning of $T_{ON3}$ 416, the $V_{SENSE}$ 316 may be less than the light load threshold voltage $V_{TH}$ 428 resulting from the previous switching periods. Therefore, the enable signal 119 is off or LOW at the beginning of TONS 416. The $V_{SENSE}$ 316 continues to decrease to even a lower value until the end of $T_{ON3}$ 416.

At the beginning of $T_{OFF3}$ 418, the drive signal 252 becomes low turning the dc-dc converter switch S1 230 off and the bias winding voltage $V_B$ 236 has a positive non-zero value. At this time, the sense capacitor C2 306 starts to charge because of the charge current $I_{C2}$ 312. The sense capacitor C2 306 continues to charge until time $t_{x2}$ 422. However, $V_{SENSE}$ 316 may only increase to a value, which is less than the light load threshold voltage $V_{TH}$ 428.

At time $t_{x2}$ 422, the capacitor voltage $V_{SENSE}$ 316 starts to decrease as the bias winding voltage $V_B$ 236 decreases substantially to zero. In operation, the sense capacitor C2 306 will begin to discharge when the bias winding voltage $V_B$ 236 becomes lower than $V_{SENSE}$ 316. $V_R$ 426 is the ripple voltage on the sense capacitor C2 306 resulting from the charging and discharging. Since the $V_{SENSE}$ 316 remains below for several such periods during NO LOAD 414 operation, the average value $V_{AVG}$ 424 of $V_{SENSE}$ 316, remains lower than the light load threshold voltage $V_{TH}$ 428. This causes the enable signal 119 to be off or LOW, which further prevents the active PFC stage in 104 from turning on.

Figure 5:
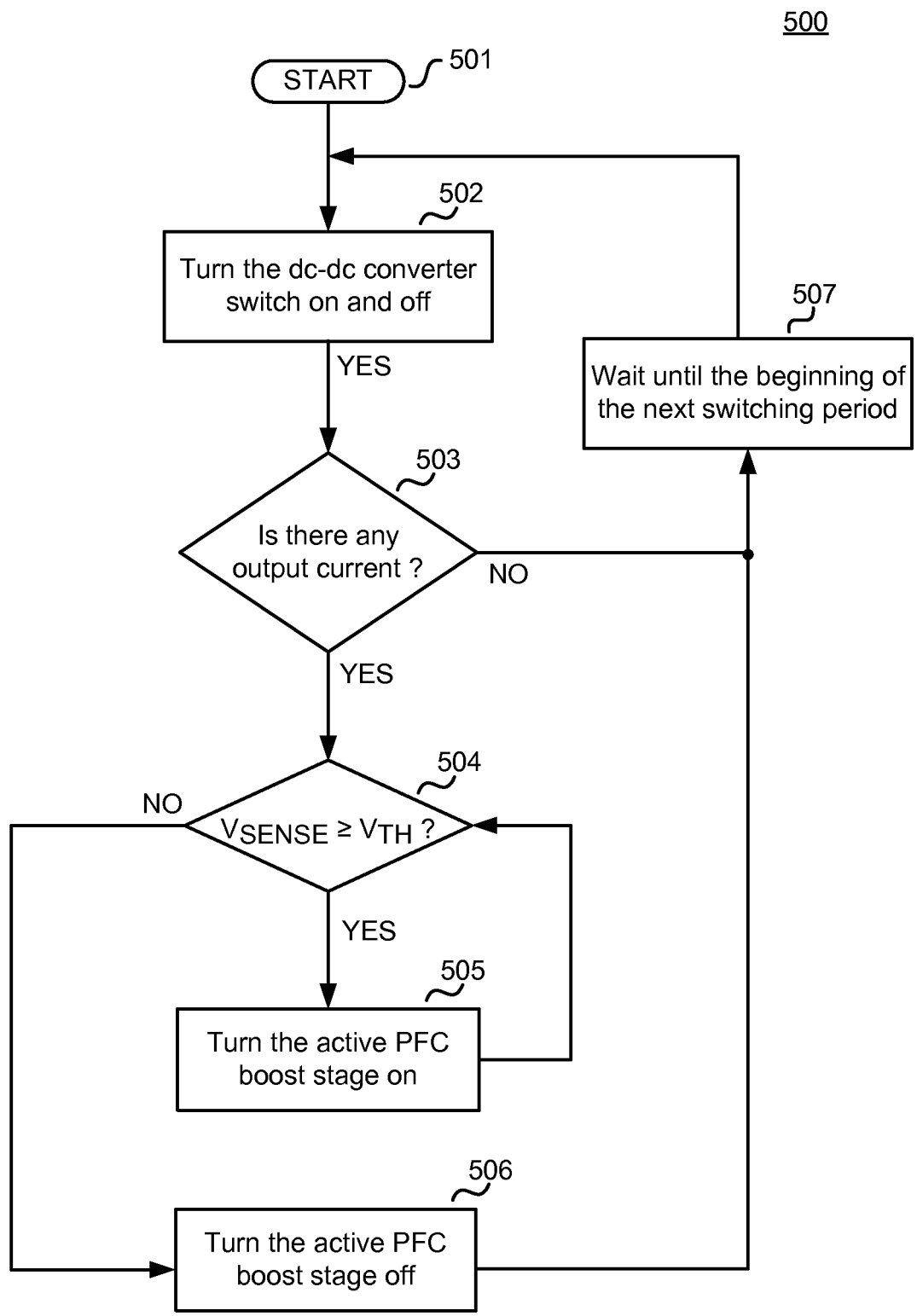
FIG. 5 is a flow diagram that illustrates an example process for turning on and turning off an example active PFC stage included in an example dc-dc converter of FIGS. 1A and 1B in accordance with the teachings of the present invention.

FIG. 5 is a flow diagram 500 that illustrates an example process for turning on or turning off the active PFC stage in response to sensing a voltage on a sense element and comparing the same to a threshold voltage. The order in which some or all of the process blocks appear in flow diagram 500 should not be deemed limiting. Rather, one of ordinary skill in the art having the benefit of the present disclosure will understand that some of the process blocks may be executed in a variety of orders not illustrated, or even in parallel.

After starting at block 501, at block 502 the dc-dc converter switch S1 230 can be turned on and then off. At the end of block 502 the process proceeds to block 503.

At block 503, it can be checked if there is any output current $I_O$ 222 at the load 220. If there is an output current $I_O$ 222 at the load 220, then the process proceeds to block 504. If there is no output current $I_O$ 222 at the load 220 then the process proceeds to block 507. At block 507, the process may wait until the beginning of the next switching period. When the next switching period occurs, the process will go back to the beginning of block 502.

At block 504, the sense element voltage $V_{SENSE}$ can be compared to the light load threshold voltage $V_{TH}$. If the sense element voltage $V_{SENSE}$ is equal to or greater than the light load threshold voltage $V_{TH}$, then the process proceeds to block 505. If the sense element voltage $V_{SENSE}$ is lower than the light load threshold voltage $V_{TH}$, then the process proceeds to block 506.

At block 505, the active PFC stage 105 is turned on. At the end of block 505 it can be checked if the sense element voltage $V_{SENSE}$ is more than the light load threshold voltage $V_{TH}$. At any time when sense element voltage $V_{SENSE}$ is lower than the light load threshold voltage $V_{TH}$, the process can proceed to block 506.

At block 506, the active PFC stage is turned off. At the end of block 506, the process proceeds to block 507.

At block 507, the process can wait for the next switching period to occur.

At the end of block 507, the process goes back to the beginning of block 502 to turn the dc-dc converter switch S1 230 on again.

Figure 6A:
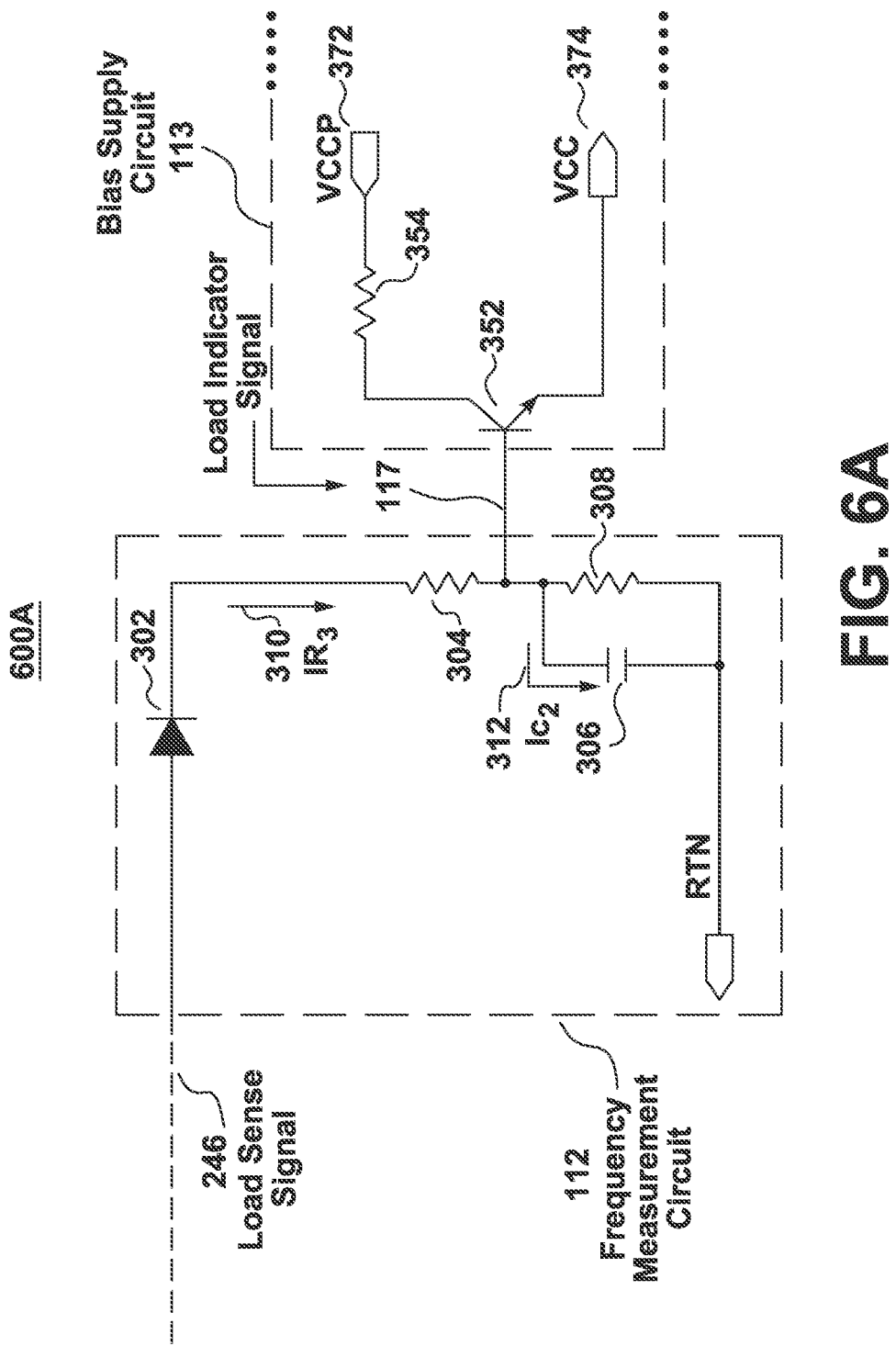
FIG. 6A illustrates an actual circuit diagram of a flyback power converter including a frequency measurement circuit, and a portion of bias supply circuit.
Figure 6B:
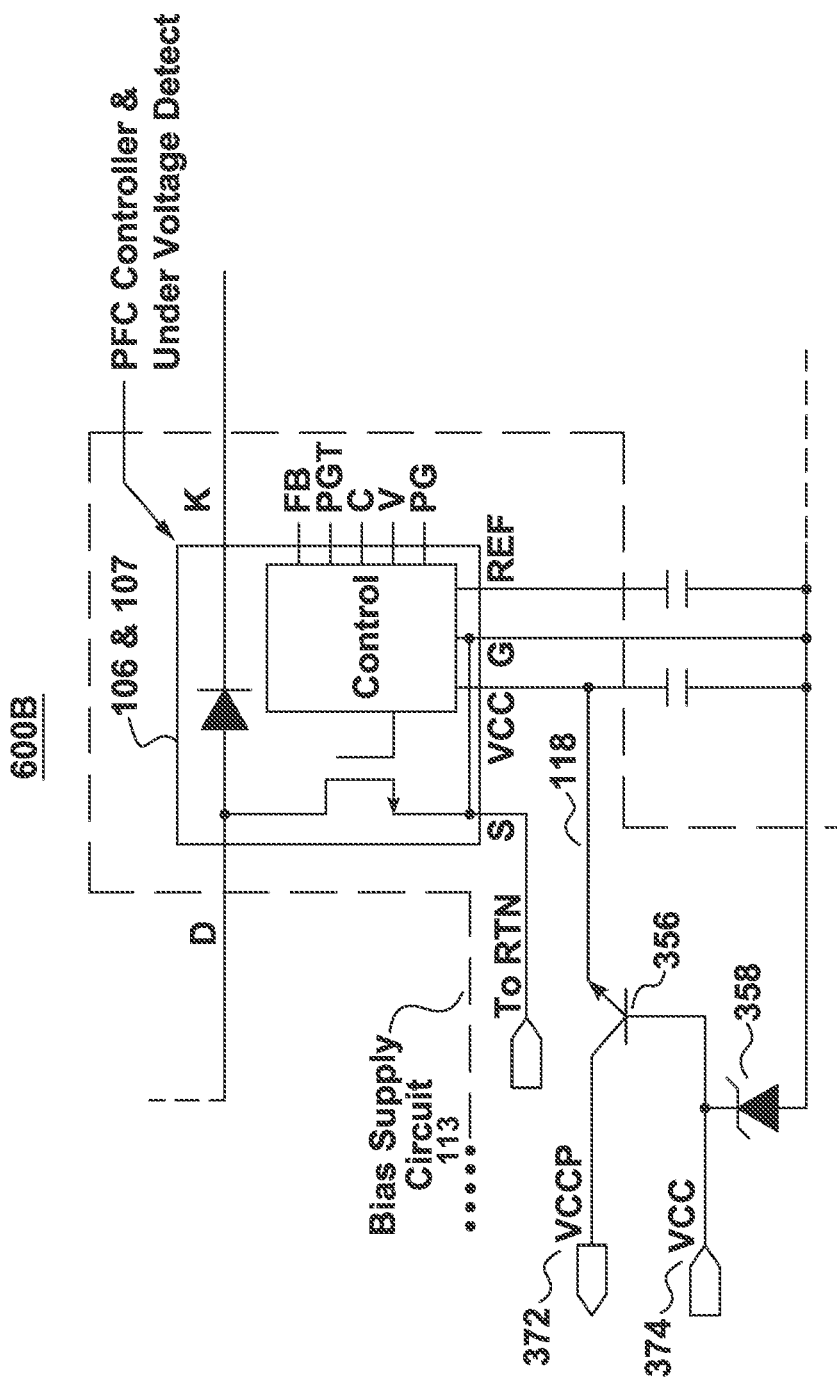
FIG. 6B illustrates an actual circuit diagram of an active PFC stage with a portion of the bias supply circuit.

FIGS. 6A and 6B together illustrate one working example of an actual circuit diagram 600A and 600B of a flyback power converter including an active PFC stage, a frequency measurement circuit, and a bias supply circuit.

FIG. 6A illustrates an example frequency measurement circuit 112 and a portion of the bias supply circuit 113. The remaining portion of the bias supply circuit 113 is illustrated later in FIG. 6B. Corresponding numerals of FIGS. 6A and 6B indicate corresponding components of FIG. 2, FIG. 3A, and FIG. 3B.

The controller U8 of FIG. 6A corresponds to the controller 214 of FIG. 2. The diode 302, resistor 304, capacitor 306, resistor 308 of FIG. 6A correspond to the diode D2 302, the resistor R3 304, the sense capacitor C2 306, and the resistor R4 308 of FIG. 3A respectively. The currents $I_{R3}$ 310 and $I_{C2}$ 312 of FIG. 6A correspond to the currents $I_{R3}$ 310 and $I_{C2}$ 312 of FIG. 3A respectively. Furthermore, transistor 352 and resistor 354 of FIG. 6A correspond to the transistor Q1 352 and resistor R5 354 of FIG. 3B respectively. The load sense signal 246 and the load indicator signal 117 of FIG. 6A correspond to the load sense signal 246 and the load indicator signal 117 of FIG. 3A. The nodes VCCP 372 and VCC 374 of FIG. 6A correspond to the nodes VCCP 372 and VCC 374 of FIG. 3B.

Referring now to FIG. 6B, the transistor 356 and diode 358 correspond to the transistor Q2 356 and diode D3 358 of FIG. 3B. The PFC controller and under voltage detect circuit (shown as 106 & 107) of FIG. 6B correspond to the PFC controller 106 and under voltage detect circuit 107 of FIG. 3B. The signal 118 corresponds to the VCC_PFC 118 signal of FIG. 3B.

The circuit elements of FIGS. 6A and 6B behave in a manner substantially similar to the corresponding circuit elements of FIGS. 3A and 3B.

As illustrated in FIG. 6A, the diode 302 is coupled to receive a load sense signal 246 from a part of the circuit (not highlighted in FIG. 6A) which provides a bias winding voltage which corresponds to the bias winding voltage $V_B$ 236. Thus the load sense signal 246 generates a current $I_{R3}$ 310 through the resistor 304. A charge current $I_{C2}$ 312 flows through the sense capacitor 306 substantially during the time when the bias winding voltage $V_B$ 236 is positive with respect to the return (not highlighted in FIG. 6A). A discharge current $I_{R3}$ 314 (not shown in FIG. 6A) flows through the resistor 308 substantially during the time when the bias winding voltage $V_B$ 236 is either zero or negative with respect to the input return (not highlighted in FIG. 6A). The frequency measurement circuit 112 provides a load indicator signal 117 to the bias supply circuit 113 as shown. As explained earlier with respect to FIG. 3A, the load indicator signal 117 is substantially equal to the $V_{SENSE}$ 316 (not shown in FIG. 6A).

Referring to both FIG. 6A and FIG. 6B, in operation, in one example, if the $V_{SENSE}$ 316 is equal to or greater than the $V_{TH}$, then the bias supply circuit of FIG. 6A and FIG. 6B will provide the VCC_MIN to the PFC controller 106 (shown in FIG. 6B) and the active PFC stage will be turned on. If the $V_{SENSE}$ 316 is lower than the $V_{TH}$, the bias supply circuit of FIG. 6A and FIG. 6B will provide a lower voltage than the VCC_MIN to the PFC controller 106 (shown in FIG. 6B) and the active PFC stage will be turned off.

The above description of illustrated embodiments of the invention, including what is described in the abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A power converter comprising:
a front end stage comprising a power factor correction controller;
an output stage comprising a DC/DC controller;
light load detection circuitry coupled to detect relatively low power consumption by a load on an output of the output stage and, in response to the detection, turn off the power factor correction controller in the front end stage; and
a bias supply circuit coupled between the front end stage and the light load detection circuitry, wherein the bias supply circuit comprises:
a first transistor having a base coupled to the light load detection circuitry;
a resistor directly coupled between the first transistor and a first voltage node;
a zener diode directly coupled between the first transistor and an input return; and
a second transistor directly coupled between the first voltage node and the front end stage, wherein the second transistor includes a base coupled to a second voltage node between the first transistor and the zener diode.

2. The power converter of claim 1, wherein the relatively low power consumption is a power consumption of 5% or less than a maximum power load of the power converter.

3. The power converter of claim 2, wherein the relatively low power consumption is a power consumption of 2.5% or less than a maximum power load of the power converter.

4. The power converter of claim 3, wherein the relatively low power consumption is a power consumption of 1% or less than a maximum power load of the power converter.

5. The power converter of claim 1, wherein the front end stage comprises an active power factor correction boost stage.

6. The power converter of claim 1, wherein the output stage further comprises a flyback converter.

7. The power converter of claim 1, wherein the output stage further comprises a power switch, wherein the DC/DC controller is configured to reduce switching frequency of the power switch in response to a light load condition.

8. The power converter of claim 7, wherein the light load detection circuitry comprises frequency sense circuitry to sense the reduction of the switching frequency by the DC/DC controller.

9. The power converter of claim 1, wherein the light load detection circuitry is to output a light load detection signal coupled to be received by the base of the first transistor in response to the detection of the relatively low power consumption by the load.

10. The power converter of claim 9, wherein the second transistor is coupled to a supply input of the power factor correction controller, the second transistor responsive to the light load detection signal to disconnect a supply of power from the supply input of the power factor correction controller.

11. The power converter of claim 1, wherein:
the power converter further comprises a rectifier coupled to rectify an input AC signal and output a first DC signal to the front end stage;
the front end stage is operative to convert the first DC signal into a second DC signal having a larger peak magnitude than the first DC signal; and
the output stage is configured to convert the second DC signal into a regulated output.

12. The power converter of claim 11, wherein:
the input AC signal is a commercial line voltage between 90 and 260 Vac; and
the regulated output is between 3 and 20 volts.

13. The power converter of claim 1, wherein:
the output stage further comprises an energy transfer element having a primary winding, a secondary winding, and a tertiary winding; and
the light load detection circuitry is coupled to the tertiary winding to detect the relatively low power consumption by the load.

14. The power converter of claim 1, wherein the power converter is a dual stage power converter.

15. A power converter comprising:
a boost power factor correction stage comprising a power factor correction controller;
a DC/DC stage comprising a DC/DC controller;
light load detection circuitry coupled to detect relatively low power consumption by a load on an output of the DC/DC stage and, in response to the detection, turn off the power factor correction controller in the boost power factor correction stage; and
a bias supply circuit coupled between the boost factor correction stage and the light load detection circuitry, wherein the bias supply circuit comprises:
a first transistor having a base coupled to the light load detection circuitry;
a resistor directly coupled between the first transistor and a first voltage node;
a zener diode directly coupled between the first transistor and an input return; and
a second transistor directly coupled between the first voltage node and the boost factor correction stage, wherein the second transistor includes a base coupled to a second voltage node between the first transistor and the zener diode.

16. The power converter of claim 15, wherein the relatively low power consumption is a power consumption of 5% or less than a maximum power load of the power converter.

17. The power converter of claim 15, wherein the boost power factor correction stage comprises an active power factor correction boost stage.

18. The power converter of claim 15, wherein the DC/DC stage further comprises a flyback converter.

19. The power converter of claim 15, wherein the DC/DC stage further comprises a power switch, wherein the DC/DC controller is configured to reduce switching frequency of the power switch in response to a light load condition.

20. The power converter of claim 19, wherein the light load detection circuitry comprises frequency sense circuitry to sense the reduction of the switching frequency by the DC/DC controller.

21. The power converter of claim 15, wherein the light load detection circuitry is to output a light load detection signal coupled to be received by the base of the first transistor in response to the detection of the relatively low power consumption by the load.

22. The power converter of claim 21, wherein the second transistor is coupled to a supply input of the power factor correction controller, the second transistor responsive to the light load detection signal to disconnect a supply of power from the supply input of the power factor correction controller.

23. The power converter of claim 15, wherein:
the power converter further comprises a rectifier coupled to rectify an input AC signal and output a first DC signal to the boost power factor correction stage;
the boost power factor correction stage is operative to convert the first DC signal into a second DC signal having a larger peak magnitude than the first DC signal; and
the DC/DC stage is configured to convert the second DC signal into a regulated output.

24. The power converter of claim 23, wherein:
the input AC signal is a commercial line voltage between 90 and 260 Vac;
and the regulated output is between 3 and 20 volts.

25. The power converter of claim 15, wherein:
the DC/DC stage further comprises an energy transfer element having a primary winding, a secondary winding, and a tertiary winding; and
the light load detection circuitry is coupled to the tertiary winding to detect the relatively low power consumption by the load.

26. The power converter of claim 15, wherein the power converter is a dual stage power converter.

27. A power converter comprising:
a rectifier coupled to rectify an input AC signal and output a first DC signal having a first peak amplitude;
a power factor correction front end stage configured to,
in a first state, receive the first DC signal output from the rectifier and output a second DC signal having a larger peak amplitude than the first peak amplitude, and
in a second state, receive the first DC signal and output a third DC signal having a smaller peak amplitude than the first peak amplitude;
an output stage coupled to receive either the second DC signal or the third DC signal from the power factor correction front end stage and output a regulated DC signal to power a load;
load detection circuitry coupled to output a low load signal in response to detection of relatively low power consumption by the load, the power factor correction front end stage configured to switch into the second state in response to the low load signal; and
a bias supply circuit coupled between the power factor correction front end stage and the load detection circuitry, wherein the bias supply circuit comprises:
a first transistor having a base coupled to receive the low load signal from the load detection circuitry;
a resistor directly coupled between the first transistor and a first voltage node;
a zener diode directly coupled between the first transistor and an input return; and
a second transistor directly coupled between the first voltage node and the power factor correction front end stage, wherein the second transistor includes a base coupled to a second voltage node between the first transistor and the zener diode.

28. The power converter of claim 27, wherein the relatively low power consumption is a power consumption of 5% or less than a maximum power load of the power converter.

29. The power converter of claim 28, wherein the relatively low power consumption is a power consumption of 2.5% or less than a maximum power load of the power converter.

30. The power converter of claim 29, wherein the relatively low power consumption is a power consumption of 1% or less than a maximum power load of the power converter.

31. The power converter of claim 27, wherein:
the power factor correction front end stage comprises a power factor correction controller; and
the power factor correction controller is off in the second state of the power factor correction front end stage.

32. The power converter of claim 27, wherein the power factor correction front end stage comprises an active power factor correction boost stage.

33. The power converter of claim 27, wherein the output stage comprises a flyback converter.

34. The power converter of claim 27, wherein the output stage comprises a power switch, wherein a switching frequency of the power switch is reduced in response to a light load condition.

35. The power converter of claim 34, wherein the load detection circuitry comprises frequency sense circuitry to sense the reduction of the switching frequency of the power switch.

36. The power converter of claim 27, wherein:
the input AC signal is a commercial line voltage between 90 and 260 Vac; and
the regulated DC signal output to the load is between 3 and 20 volts.

37. The power converter of claim 27, wherein the power factor correction front end stage comprises:
a power factor correction controller.

38. The power converter of claim 27, wherein the power converter is a dual stage power converter.

* * * * *

UNITED STATES PATENT AND TRADEMARK OFFICE
CERTIFICATE OF CORRECTION

PATENT NO. : 9,866,108 B2
APPLICATION NO. : 14/876734
DATED : January 9, 2018
INVENTOR(S) : Mayell et al.

Page 1 of 1

It is certified that error appears in the above-identified patent and that said Letters Patent is hereby corrected as shown below:

On the Title Page

Item (73), Assignee "Power Intergrations, Inc.," should read --Power Integrations, Inc.,--

Signed and Sealed this
Thirtieth Day of April, 2019

Andrei Iancu
*Director of the United States Patent and Trademark Office*